(12) United States Patent
Levenberg

(10) Patent No.: US 8,756,661 B2
(45) Date of Patent: Jun. 17, 2014

(54) DYNAMIC USER AUTHENTICATION FOR ACCESS TO ONLINE SERVICES

(75) Inventor: Richard Levenberg, Lafayette, CA (US)

(73) Assignee: UFP Identity, Inc., Wilmington, DE (US)

( * ) Notice: Subject to any disclaimer, the term of this patent is extended or adjusted under 35 U.S.C. 154(b) by 390 days.

(21) Appl. No.: 12/862,452

(22) Filed: Aug. 24, 2010

(65) Prior Publication Data

US 2011/0047608 A1 Feb. 24, 2011

Related U.S. Application Data

(60) Provisional application No. 61/274,922, filed on Aug. 24, 2009.

(51) Int. Cl.
*H04L 29/06* (2006.01)

(52) U.S. Cl.
USPC .................................................. 726/4; 726/7

(58) Field of Classification Search
USPC .......................................................... 726/4, 7
See application file for complete search history.

(56) References Cited

U.S. PATENT DOCUMENTS

| | | | |
|---|---|---|---|
| 6,618,806 B1 * | 9/2003 | Brown et al. .................. | 713/186 |
| 6,928,547 B2 * | 8/2005 | Brown et al. .................. | 713/186 |
| 6,959,336 B2 * | 10/2005 | Moreh et al. ................... | 709/229 |
| 7,194,547 B2 * | 3/2007 | Moreh et al. ................... | 709/229 |
| 7,194,554 B1 * | 3/2007 | Short et al. ..................... | 709/246 |
| 7,260,724 B1 * | 8/2007 | Dickinson et al. ............. | 713/182 |
| 7,290,278 B2 * | 10/2007 | Cahill et al. ..................... | 726/6 |
| 7,373,515 B2 * | 5/2008 | Owen et al. ................... | 713/182 |
| 7,409,705 B2 * | 8/2008 | Ueda et al. .......................... | 726/5 |
| 7,453,905 B2 * | 11/2008 | Watanuki et al. ............. | 370/466 |
| 7,623,499 B2 * | 11/2009 | Yahagi ........................... | 370/338 |
| 7,689,716 B2 * | 3/2010 | Short et al. ..................... | 709/246 |
| 7,710,984 B2 * | 5/2010 | Dunk ............................. | 370/400 |
| 7,765,580 B2 * | 7/2010 | Vandergeest et al. ............. | 726/2 |
| 7,941,669 B2 * | 5/2011 | Foley et al. .................... | 713/182 |
| 8,005,093 B2 * | 8/2011 | Huang et al. ................. | 370/395.5 |
| 8,132,016 B1 * | 3/2012 | Stewart et al. ................. | 713/182 |
| 8,214,886 B2 * | 7/2012 | Foley et al. ......................... | 726/6 |
| 8,255,982 B2 * | 8/2012 | Foley et al. ......................... | 726/6 |
| 8,296,831 B2 * | 10/2012 | Foley et al. ......................... | 726/6 |
| 8,601,560 B2 * | 12/2013 | Kim et al. .......................... | 726/7 |
| 2002/0065784 A1 * | 5/2002 | Ranzini et al. .................. | 705/64 |
| 2002/0087894 A1 * | 7/2002 | Foley et al. .................... | 713/202 |
| 2003/0046391 A1 * | 3/2003 | Moreh et al. ................... | 709/225 |
| 2003/0046551 A1 * | 3/2003 | Brennan ........................ | 713/185 |
| 2003/0115142 A1 * | 6/2003 | Brickell et al. ................. | 705/51 |
| 2003/0163739 A1 * | 8/2003 | Armington et al. ........... | 713/202 |

(Continued)

*Primary Examiner* — David Garcia Cervetti

(74) *Attorney, Agent, or Firm* — Carmen Patti Law Group, LLC

(57) ABSTRACT

A dynamic authentication system that makes authentication stronger, while reducing the cost to business and the burden to users. The system includes a service that provides centralized, non-federated, proxied authentication. The system uses a two-pass authentication process that first receives a supposed identity of the user and then determines one or more authentication criteria for proving that supposed identity. When the user attempts to use an online service that relies on the dynamic authentication system for authentication, the service requests the user's identity. The system dynamically determines authentication criteria for the user to prove the provided identity belongs to the user. In the second pass, the service receives a response from the user containing additional authentication information, and forwards the received response to the system for verification. If verification succeeds, the service allows the user to access the requested resources.

19 Claims, 5 Drawing Sheets

(56) References Cited

U.S. PATENT DOCUMENTS

| | | | |
|---|---|---|---|
| 2004/0010724 A1* | 1/2004 | Brown et al. | 713/202 |
| 2004/0013130 A1* | 1/2004 | Blanchet et al. | 370/466 |
| 2004/0083394 A1* | 4/2004 | Brebner et al. | 713/202 |
| 2004/0088385 A1* | 5/2004 | Blanchet et al. | 709/220 |
| 2004/0117662 A1* | 6/2004 | Ong | 713/202 |
| 2004/0133692 A1* | 7/2004 | Blanchet et al. | 709/230 |
| 2004/0153656 A1* | 8/2004 | Cluts et al. | 713/186 |
| 2004/0187018 A1* | 9/2004 | Owen et al. | 713/200 |
| 2004/0225880 A1* | 11/2004 | Mizrah | 713/155 |
| 2005/0091527 A1* | 4/2005 | Swander et al. | 713/201 |
| 2005/0152298 A1* | 7/2005 | Thubert et al. | 370/312 |
| 2005/0190713 A1* | 9/2005 | Watanuki et al. | 370/315 |
| 2005/0268107 A1* | 12/2005 | Harris et al. | 713/182 |
| 2005/0273866 A1* | 12/2005 | Brown et al. | 726/28 |
| 2006/0075473 A1* | 4/2006 | Moreh et al. | 726/5 |
| 2006/0174332 A1* | 8/2006 | Bauban et al. | 726/5 |
| 2006/0206722 A1* | 9/2006 | Zhang | 713/186 |
| 2006/0218393 A1* | 9/2006 | Hernandez et al. | 713/167 |
| 2006/0239254 A1* | 10/2006 | Short et al. | 370/352 |
| 2007/0005988 A1* | 1/2007 | Zhang et al. | 713/186 |
| 2007/0186106 A1* | 8/2007 | Ting et al. | 713/168 |
| 2008/0028453 A1* | 1/2008 | Nguyen et al. | 726/9 |
| 2008/0141339 A1* | 6/2008 | Gomez et al. | 726/1 |
| 2008/0184349 A1* | 7/2008 | Ting | 726/7 |
| 2008/0212771 A1* | 9/2008 | Hauser | 380/44 |
| 2009/0036098 A1* | 2/2009 | Lee et al. | 455/411 |
| 2009/0080387 A1* | 3/2009 | Dell'Uomo et al. | 370/338 |
| 2009/0199264 A1* | 8/2009 | Lang | 726/1 |
| 2009/0225762 A1* | 9/2009 | Davidson et al. | 370/401 |
| 2010/0079243 A1* | 4/2010 | Hamada | 340/5.83 |
| 2010/0115113 A1* | 5/2010 | Short et al. | 709/228 |
| 2010/0148922 A1* | 6/2010 | Yamada et al. | 340/5.82 |
| 2010/0162386 A1* | 6/2010 | Li et al. | 726/19 |
| 2010/0242092 A1* | 9/2010 | Harris et al. | 726/3 |
| 2010/0242105 A1* | 9/2010 | Harris et al. | 726/12 |
| 2010/0313037 A1* | 12/2010 | Ward | 713/189 |
| 2011/0173685 A1* | 7/2011 | Chai et al. | 726/6 |

* cited by examiner

DYNAMIC USER AUTHENTICATION FOR ACCESS TO ONLINE SERVICES

CROSS-REFERENCE TO RELATED APPLICATIONS

The present application claims the benefit of U.S. Provisional Patent Application No. 61/274,922 entitled "CENTRALIZED, NON-FEDERATED, PROXIED AUTHENTICATION," and filed on Aug. 24, 2009, which is hereby incorporated by reference.

BACKGROUND

Authenticating users to websites, corporate accounts, and other online sites attempts to prove the identity of a user so that the user can access private data or services associated with the user. In the current authentication space, each website defines the manner in which the user authenticates. This usually includes a username and password. It is very difficult for users to manage passwords at all the online sites they visit, so users often use the same, easy to remember password at each website. Since every website has to manage the authentication for the users, stronger mechanisms of authentication are not widely in use. Websites are hesitant to adopt additional technologies that might lock them in with a large up-front cost and proprietary solutions. At the same time, online fraud is on the rise and business websites incur billions of dollars of lost revenue.

Online commerce and other Internet activities are dependent on a high level of confidence in the security of personal transactions, whether they involve money or simply information. Online fraud not only threatens these transactions, but also results in billions of dollars of lost revenue and wasted resources. The single greatest source of web fraud and financial risk comes from authentication—that is, the process by which a specific end user proves his or her identity for conducting an online transaction. Most authentication systems in place today are inherently vulnerable to failure; the typical practice of individual usernames and passwords entered into "secure" web sites may inspire general confidence that is not warranted in light of common causes of compromised security and likelihood of future problems.

Web "security" varies greatly from site to site. Not all website records are equally secure, and there have been many high-profile security-related data losses over the past several years that have included users' passwords, credit cards, and social security numbers. In addition, some web site owners do not have systems in place to monitor the integrity of users' data, let alone respond to compromised accounts. As such, they may not even know that their files have been hacked. Fraud forgiveness policies create false security. Credit card companies strive to inspire confidence in web commerce by protecting users from fraudulent transactions, but by transferring responsibility, they inadvertently encourage bad habits and hide the full extent of the threat.

Currently, almost all online services use passwords for authentication. The user signs in with a username, and then enters a password to prove the user's identity. This system is not as secure as many users and institutions believe. Whether a user transfers funds at a bank site, makes an online purchase from an e-commerce site, or uses online services intended to be private to the user, the parties involved conduct their business based more on trust than actual security. There are a number of reasons for this failure. Businesses and merchants are not authentication experts. Most companies know very little about authentication, because it is not their core business. Outsourcing online transactions and authentication to dedicated experts helps, but the current solutions offered still rely on processes that are inherently susceptible to failure and fraud.

Users pick easy-to-remember (and hack) passwords. Users are prone to selecting passwords that are easy to remember, which makes them similarly easy for hackers to exploit. A recent analysis of a large database showed that about 30% of users choose passwords of six or fewer characters. Almost 60% choose their passwords out of a limited set of alphanumeric characters, and nearly 50% of users used common names, slang words, dictionary words, or other trivial passwords comprised of consecutive digits or characters adjacent to one another on the QWERTY keyboard. In fact, the most common password among users is "123456." Users also pick the same password for multiple sites. Managing multiple passwords for multiple online accounts is burdensome, so most users tend to have one or two passwords that they use across multiple web sites. Another recent large-scale study conducted by Microsoft of password habits found that the average user has 6.5 passwords across 25 various accounts, and types an average of eight passwords per day. This habit increases vulnerability even more, because the loss of password security at one site can compromise many other accounts.

Users are not often aware of hacked accounts. There currently is no universally accepted (and expected), systematic process to alert users that their account(s) have been compromised and to advise them of corrective measures. Changing passwords is too time-consuming. When users are aware of a compromised account, they rarely go to each site on which they use the same password and change it one by one. Given the large number of online accounts most people have, and the tendency to use the same or similar passwords on each site, it is not surprising that one compromised site leads to many others.

Strong authentication is cost-prohibitive. Web site owners assume responsibility for protecting their users' passwords and sensitive information, and are potentially liable for their loss. While stronger mechanisms of authentication are available, such as hardware and software token systems, these proprietary solutions involve a significant up-front cost plus ongoing resources to maintain them. Most businesses are hesitant to make such an investment.

DETAILED DESCRIPTION

Figure 1:
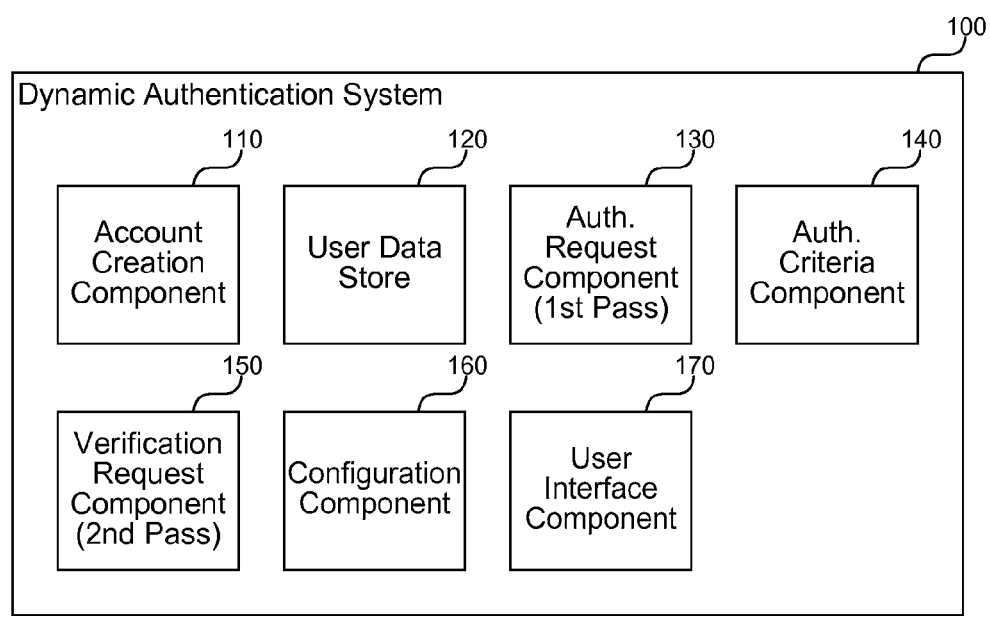
FIG. 1 is a block diagram that illustrates components of the dynamic authentication system, in one embodiment.

A dynamic authentication system is described herein that makes authentication stronger, while reducing the cost to business and the burden to users. The system includes a service that provides centralized, non-federated, proxied authentication (centralized in that every authentication is handled by a centralized service, non-federated in that ad-hoc business relationships are discouraged, and proxied authentication in that website authentication is proxied to the centralized service rather than redirected to the centralized service). In some embodiments, the dynamic authentication system uses a two-pass authentication process that first receives a supposed identity of the user and then determines one or more authentication criteria for proving that supposed identity. A user is enrolled into the system prior to signing into an online service. Account creation may include selecting one or more preferred modes of authentication. When the user attempts to use an online service that relies on the dynamic authentication system for authentication, the service requests the user's identity (e.g., through a username). The online service initiates a request to the system that includes the user's identity. The system dynamically determines authentication criteria for the user to prove the provided identity belongs to the user, and responds to the online service's request with information for requesting additional information from the user. For example, the information may include user interface elements for the service to display to collect additional information from the user. The service receives a response from the user containing additional authentication information, and forwards the received response to the system for verification. The system provides a response that indicates whether the user has satisfactorily provided the user's identity. If so, the service allows the user to access the requested resources.

Unlike static authentication systems that are locked into one mode of authentication (e.g., passwords or hardware tokens), the dynamic authentication system dynamically selects one or more modes of authentication based on various factors surrounding the request. For example, the system may consider time of day, past action history of the user, the resource to which access is requested, and so forth. Unlike traditional systems that request a username and password at the same time (e.g., in one pass), the dynamic authentication system is two-pass. During the first pass, the system receives a user's proposed identity, and during the second pass, the system provides authentication proof criteria and receives a user response. Based on various circumstances of the request and the system's level of confidence that the user is who he claims to be, it is possible that the user receives one authentication method at one time and then another authentication method upon a subsequent attempt. For example, a user may be asked for a password during one access attempt and for a numeric code sent in a message to the user's registered phone in another access attempt. Thus, the dynamic authentication system provides stronger authentication without adding burden to the sites that choose to delegate authentication services to the system.

The dynamic authentication system allows a user to manage authentication tokens for all of the user's online accounts. Currently, online users are forced to choose between the increased security of managing multiple passwords for all their accounts but usually succumb to the convenience of using one memorized password at the cost of higher risk. The system allows the user to use a strong password, or stronger authenticators for online access. Hardware tokens, for example, offer stronger authentication but it is not feasible to carry multiple hardware tokens for each online account. With the dynamic authentication system, the user can use a single hardware token for any account.

As users get used to using strong authentication for all online transactions, additional risk mitigation will become more commonplace. For the higher risk online operations (money transfer, sensitive data access, and so forth), the system may request that users utilize multiple authentication mechanisms. The system allows users to use any of their tokens for any online transaction.

In the current web authentication space, the predominant authenticator is the ubiquitous password. Users typically use the same password for every login and each web site maintains its own instance of the password. This makes it difficult for a user to change passwords easily. The dynamic authentication system allows the user to maintain one and only one instance of the user's password. Each site uses the system to perform authentication rather than maintain a separate copy of the password. This allows the user to create a more complex password since the user only has to remember one, and it allows the user to change the user's password frequently and easily.

The dynamic authentication system also provides many sophisticated authenticators to use in addition to or instead of standard passwords. For example, users can use hardware tokens with the system. The system can also notify users of each login attempt or of particularly sensitive login attempts so that the user is aware of unexpected logins.

Online service providers interact with the dynamic authentication system for authentication only. The system does not use customer data except as it pertains anonymously to the transaction and only then as much as each business wants to provide. Unlike other solutions, the system does not redirect customers to another site for authentication. The customer remains on the original site for the entire session.

Online service providers also do not have to worry about distributing authentication tokens to their users. The system can work with tokens that users have already, such as the user's mobile phone. The system handles all the headache of installing and maintaining the proprietary back-ends needed to utilize the various authentication methods. With very little non-recurring expense (NRE) and small transaction fees, the system provides online service providers with strong, flexible authentication for the entire user base.

The dynamic authentication system also improves the experience for vendors of more sophisticated authentication tokens (such as hardware tokens). Advanced tokens have had difficulty penetrating the consumer channel. The system removes the barriers that have made it difficult to introduce stronger authentication tokens into consumer distribution channels. First, the system works with token vendors to integrate their proprietary backend into the system infrastructure so that the system can support the vendors' tokens. The system can also help token vendors sell their tokens into various distribution channels. Since the dynamic authentication system is handling the upfront headaches of installing and maintaining proprietary token back-ends, customers of tokens are no longer burdened.

FIG. 1 is a block diagram that illustrates components of the dynamic authentication system, in one embodiment. The system 100 includes an account creation component 110, a user data store 120, an authentication request component 130, an authentication criteria component 140, a verification request component 150, a configuration component 160, and a user interface component 170. Each of these components is described in further detail herein.

The account creation component 110 receives user information and creates an account for the user with the system 100. The user information may include the user's name, contact information for the user, and one or more methods of authentication that the user prefers. The user may also set a password or other authentication method for administrative access to the system 100 and may set an expiration for authentication information (e.g., a time after which to request a change of password). The account creation component 110 gathers the user information and stores the information in the user data store 120.

The user data store 120 stores user information about users of the system. The user data store 120 may include one or more files, file systems, hard drives, databases, cloud-based storage services, or other storage mechanisms for persisting user data over time and across user sessions with the system 100. The user information may include information added by the system, such as historical information about a user's authentication attempts, online sites the user has visited from which authentication requests were received, past authentication failures, and so forth.

The authentication request component 130 receives first requests from online services from users attempting to access the online services, wherein the requests include user identity information. For example, a user attempting to view online bank account information may provide a username to a bank website that the bank website forwards to the system 100. In the two-pass process described herein, this represents the first pass. The online service may include information in the request that identifies the online service and other user information. Users may specify different authentication methods for different online services. For example, a user may prefer a higher level of confidence authentication method for accessing the user's bank account than for accessing a social network profile associated with the user. An online service may also provide information such as the requestor's Internet Protocol (IP) address, a time of the request, and so forth. The authentication request component 130 invokes the authentication criteria component 140 to determine one or more authentication methods to use for proving the user's identity, and provides relevant information received with the request.

The authentication criteria component 140 determines one or more authentication criteria for proving a user's identity in response to a received authentication request, and provides a response to each received request based on the determined authentication criteria. Authentication criteria may be determined by the user, by an online service being accessed, or automatically by the system 100. For example, a user may manually specify one or more authentication methods. The user may specify a general method to use for multiple online services, or individual authentication methods to use for each online service. For example, a user may prefer stronger authentication based on the sensitivity of data that a particular online service provides. In some embodiments, the online service may indicate a preference for a particular authentication level that influences the authentication criteria selected by the authentication criteria component 140. For example, a bank may request a strong authentication method. The system may also automatically determine one or more authentication criteria. For example, if the system detects suspicious activity, such as authentication requests from a foreign country, the system may select a stronger method of authentication than for an authentication request initiated from the user's home IP address. The system 100 may also soften based on past activity. For example, if the user has authenticated by a very reliable authentication method from a particular computer system, then the dynamic authentication system 100 may request less information or use less burdensome authentication methods for a subsequent request.

In some embodiments, the system 100 operates across multiple online services accessed by the user that invoke the system 100 for user authentication. For example, if the user accesses a first website and proves her identity, then the system may select a less burdensome authentication method for a subsequent access to a second website. Once a user has authenticated at the first site, the system has a high degree of confidence that the user is who she claims to be for some amount of time after the last access request. The system may use factors such as the computer from which the user is requesting access, the time of day, the user's past historical patterns, whether the online service is commonly accessed by the user, how fast the user types and how it compares to past observations, and other information to select an appropriate authentication method for any particular access request. The system may also increase the selected level of authentication based on actions that are known to indicate potentially fraudulent activity, such as access outside of a normal time for the user, fast accesses that appear automated of a variety of online services, access from an unusual geographic location for the user, reuse of an expired token, and so forth.

The verification request component 150 receives second requests from online services from users attempting to access the online services, wherein the requests include user responses to the determined authentication criteria. In the two-pass process described herein, this represents the second pass. The authentication criteria component 140 may have asked the user for many types of information. For example, the component 140 may send a numeric or other code to the user's cell phone or instant messaging client and ask the user to enter the received code in a dialog box displayed on a website of the online service that the user is attempting to access. The verification request component 150 receives this information and determines whether the user has satisfied the authentication criteria. If the user has satisfied the authentication criteria, then the user's identity is sufficiently proven and the verification request component 150 sends a response to the online service confirming the user's identity. If the user fails to satisfy the criteria, then the component 150 may provide an error response or send another set of authentication criteria to allow the user to retry the authentication attempt.

The configuration component 160 receives configuration information from parties to the system 100 to modify system 100 behavior. For example, users may access the system 100 to change authentication methods, change passwords, disable one or more potentially compromised user tokens, and so forth. Online services may access the system 100 to change a requested strength of authentication for that service, to set information about the online service (e.g., what type of service it provides or the sensitivity of information it stores), and so forth. An operator of the system 100 may access the configuration component 160 to add new authentication methods as new methods are integrated with the system. The operator may also access the system to retrieve historical information or other reports, to lock out fraudulent users, or to perform other management tasks.

The user interface component 170 provides a user interface to users, online service providers, and operators of the system 100 to interact with the system 100. For example, the user interface component 170 may provide a website front-end to the system 100 through which users can access the account creation component 110 or configuration component 160. The user interface component 170 may also provide one or more interfaces for online service providers to configure access to the system 100 or to register to use the system 100 as an authentication provider for their online services. The user interface component 170 provides one or more interfaces to system 100 operators to monitor, configure, and update the system 100. The user interfaces may include a traditional graphical user interface (GUI), a console user interface (CUI), a programmatic interface (e.g., Simple Object Access Protocol (SOAP)), or any other interface for accessing the system 100.

The computing device on which the dynamic authentication system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
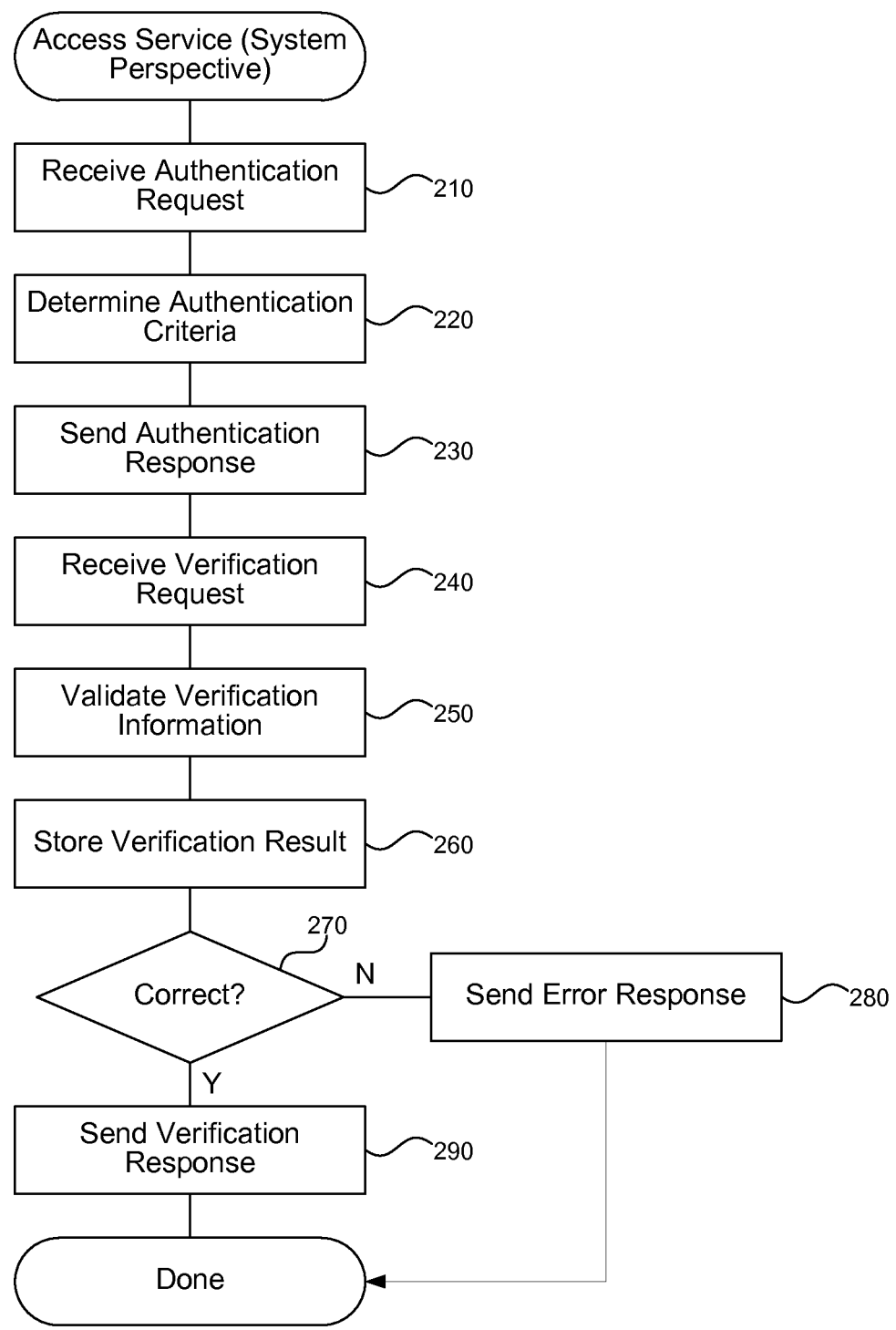
FIG. 2 is a flow diagram that illustrates processing of the dynamic authentication system to access an online service from the system's perspective, in one embodiment.

FIG. 2 is a flow diagram that illustrates processing of the dynamic authentication system to access an online service from the system's perspective, in one embodiment. The dynamic authentication system connects end users and businesses, such as banks, merchants, and other online service providers. End users sign up for a personal account, and businesses contract with the system operator to provide hosted authentication services. The following steps illustrate the process of a typical authentication for a user conducting some type of online transaction with a business that is an online service provider using the dynamic authentication system.

Beginning in block 210, the system receives from an online service an authentication request that includes user identity information and an indication of the online service that submitted the request. For example, a user accessing an online service may provide a username or other identity information (e.g., an email address) to the online service. Communication between the user's client and online service and between the online service and the authentication system may typically occur over an encrypted protocol such as HTTPS. The user may or may not be aware that the online service uses the system described herein for authentication. The online service forwards the user identity information to the system and may append information about the online service (e.g., a Uniform Resource Locator (URL) or other information).

Continuing in block 220, the system determines one or more authentication criteria to use to authenticate the identified user. The system may base the determined criteria on the user's identity, the online service that submitted the request, historical information stored about the user, and other factors. In some embodiments, the system attempts to determine a least burdensome set of authentication criteria that will provide a sufficient degree of confidence in the user's identity in accordance with the sensitivity of information to which the user is requesting access. For example, if the user typically wakes up each day, accesses his email, and then checks his bank balance, the system may receive a request to access the user's email, note that the time of day is typical for such a request, and allow the request if the user can supply a password. If the user next requests access to his bank balance, then the system may note that this sequence of events is typical for the user and allow the request based only on the user answering a simple question (e.g., what year was the user born?). The system can adapt the rigor of authentication based on the circumstances of the request. If the request is out of character for the user (e.g., foreign location or computer, out of normal time range), then the system can apply more rigor. If the request comports with the user's typical habits, then the system can apply less rigor.

Continuing in block 230, the system sends to the online service an authentication response that requests satisfaction of the determined authentication criteria. The response may include user interface elements (e.g., a Hypertext Markup Language (HTML) form for providing the requested criteria) for requesting the determined authentication criteria. For example, if the system determines that a simple question to which the user would know the answer is sufficient for authentication, then the response may include a text box that displays the question, a text box for receiving the response, and a submission button. If the authentication criteria include entering a password and a numeric code sent to the user's mobile phone, then the response may include a text box for entering the password and a text box for entering the numeric code.

Continuing in block 240, the system receives from the online service a verification request that includes user identity information and a response to the authentication criteria. The verification request provides one or more answers to any previously presented authentication queries to the user. The request may include one or more passwords, hardware token identifiers, numeric codes, answers to questions, and so forth. In some embodiments, the system may operate using a stateless model (e.g., to prevent denial of service (DoS) attacks), so that no state is stored in memory following the authentication request. Accordingly, the verification request may include all of the information that the system uses to determine if the system will allow access to the requested online service. In some cases, the system may send signed and/or encrypted information in the authentication response (e.g., the correct answers to the authentication criteria) that the online service passes back to the system in the verification request. In this way, the system can make the online service responsible for storing and returning any state information used by the system to evaluate the verification request.

Continuing in block 250, the system validates the information received in the verification request to determine whether a user requesting access is the user identified by the user identity information. How the information is validated depends on the determined authentication criteria. If the system sent a numeric code to the user's mobile phone, then validation includes comparing the sent numeric code to a numeric code entered in response by the user to determine whether the codes match. Similarly, validating a password may include comparing a received password to a password stored in the user data store managed by the system.

Continuing in block 260, the system optionally stores the verification result and information about the request for subsequent use. For example, the system may adapt the authentication criteria used based on historical information about the user's past requests. This step stores the information about the current request that will be used to evaluate future requests. For example, the system may store access time, whether the user succeeded in authenticating on the first attempt, a computer (e.g., through IP address or other information) the user was using, and so forth. Continuing in decision block 270, if the system determines that the information received in the verification request matches one or more expected answers, then the system continues at block 290, else the system continues at block 280. Continuing in block 280, the system sends to the online service an error response indicating that the access request is denied. For example, the user may have provided an incorrect password or other incorrect verification information. After block 280, the system completes.

Continuing in block 290, the system sends to the online service a verification response indicating that the access request is allowed. The online service can then permit the user to access any resources for which the online service requests users to authenticate to access. The verification response may include a Boolean value indicating whether access is allowed as well as other information about the user. After block 290, these steps conclude.

Although the described process of authentication includes more steps than the simpler and vastly more vulnerable approach of checking a user's name and password against the contents of a merchant's online database, the solution described herein is more effective at protecting businesses and users because the user has immediate control of the authentication process. If the user's password is stolen, the user can change the password as soon as the user notices for all of the user's online accounts. The user can use different levels of protection for different levels of sign-in needs. The user does not even need to keep track of all of his passwords any longer, since he can optionally have a password sent to his cell phone, IM client, or email.

Figure 3:
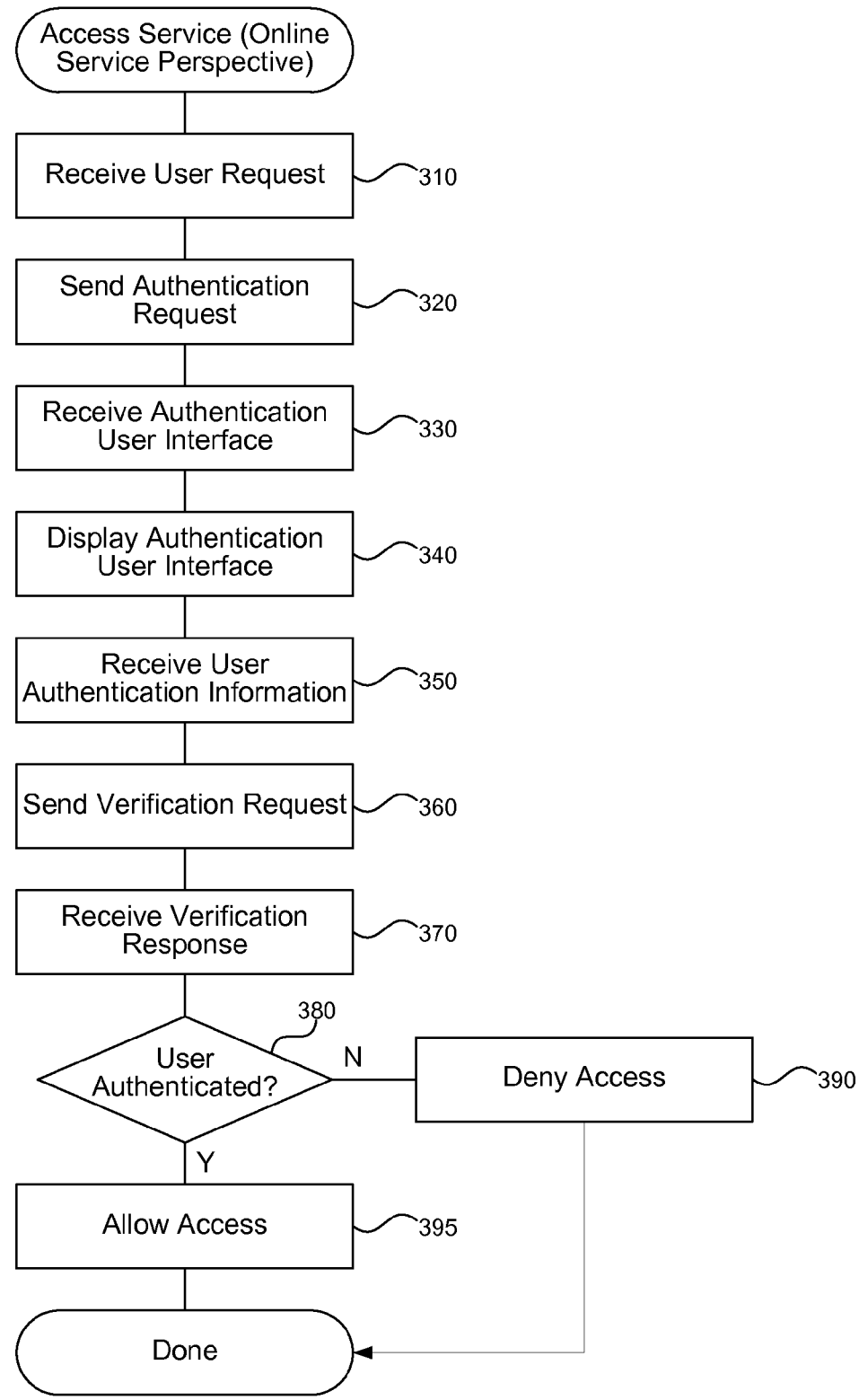
FIG. 3 is a flow diagram that illustrates processing of the dynamic authentication system to access an online service from the online service's perspective, in one embodiment.

FIG. 3 is a flow diagram that illustrates processing of the dynamic authentication system to access an online service from the online service's perspective, in one embodiment. Beginning in block 310, the online service receives from a user a request to access the online service. For example, the user may visit a web site that provides a user interface for the online service and attempt to access a protected resource. The system may display a username prompt to the user and receive a username from the user. Note that unlike traditional static authentication systems, the system may not receive additional authentication information at this time, such as a password.

Continuing in block 320, the online service sends an authentication request to a hosted authentication provider, wherein the request identifies the user and requests one or more authentication methods for verifying the user's identity. For example, the online service may send a message to a hosted service implementing the system. The online service may include information about the online service and a desired level of authentication confidence with the request. Continuing in block 330, the online service receives from the hosted authentication provider user interface elements to receive information from the user to respond to one or more authentication methods identified by the hosted authentication provider. For example, the provider may determine that the user can authenticate using a password, and may send a user interface description for receiving a password.

Continuing in block 340, the online service displays the received user interface elements to the user. For example, the hosted authentication provider may provide HTML layout information that the online service sends to the user in a web page. Continuing in block 350, the online service receives from the user authentication information through the displayed user interface elements. For example, if the user interface elements comprise an HTML form, the online service may receive an HTTP POST message when the user submits information through the form. The user interface may also include Asynchronous JavaScript and XML (AJAX) or other modern user interface tools for receiving information from a user.

Continuing in block 360, the online service sends to the hosted authentication provider a verification request that includes the authentication information received from the user. For example, the system may forward the information received from the user and may include additional information added by the online service (such as information about the online service). Continuing in block 370, the online service receives from the hosted authentication provider a verification response that indicates whether the authentication information provided by the user was sufficient to prove the user's identity. For example, if the provider requested a password from the user, then the verification response indicates whether the password was correct.

Continuing in decision block 380, if the verification response indicates that the user's identity is proven, then the system continues at block 395, else the system continues at block 390. Continuing in block 390, the online service denies access to the online service. In some embodiments, the online service may allow the user a certain number of retries, and may send additional authentication requests to the hosted authentication provider to allow the user to try to authenticate again. After block 390, the system completes. Continuing in block 395, the online service allows the user to access areas of the online service that involve authentication. For example, the user may be granted access to data stored on behalf of the user, such as bank account information. After block 395, these steps conclude.

Figure 4:
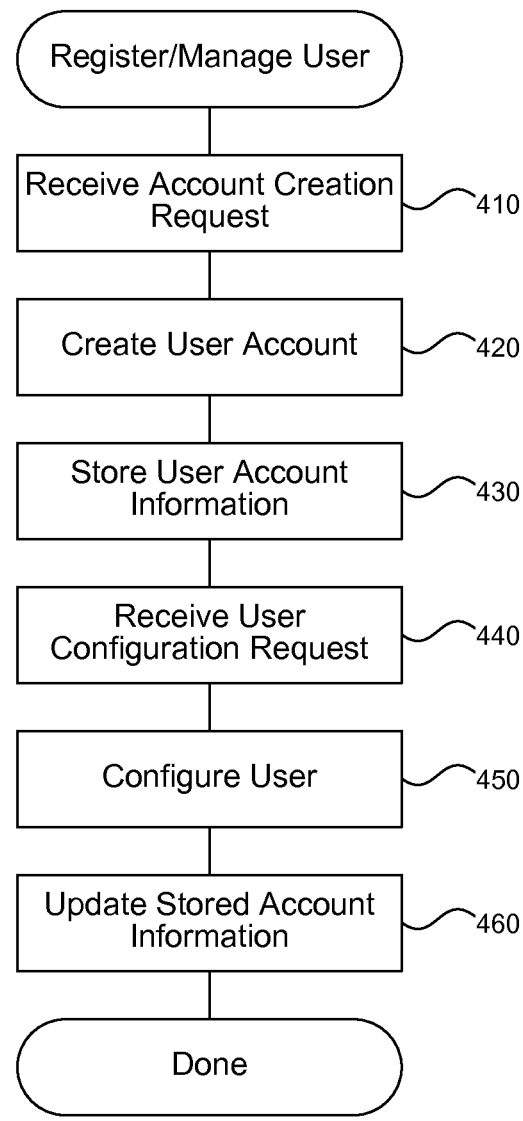
FIG. 4 is a flow diagram that illustrates processing of the dynamic authentication system to register or configure an account with the system, in one embodiment.

FIG. 4 is a flow diagram that illustrates processing of the dynamic authentication system to register or configure an account with the system, in one embodiment. Beginning in block 410, the system receives a request to create an account. For example, the system may provide a web-based or other user interface through which the requestor can access one or more administrative functions of the system, such as account creation. The requestor may provide various information requested by the system, such as the user's full name, email address, mobile number, and so forth. The system may use this information for different authentication methods offered by the system for proving the user's identity. Accounts may be created in a variety of ways. For example, an online service may use the authentication system transparently to users and may create accounts on behalf of users for use with the system (e.g., using a batch process). Alternatively or additionally, incentives may be provided (e.g., the ability for single sign-on across multiple services), so that users themselves are encouraged to create accounts.

Continuing in block 420, the system creates the requested account. For example, the system may create a row in a database that represents the user's information in a data store managed by the system. Continuing in block 430, the system stores user account information received from the user in the created account. For example, the system may store information received about the user in the user data store described herein. The system persists the information in anticipation of future requests to authenticate the user for the user of one or more online services that subscribe to the system for authentication services.

Continuing in block 440, the system may later receive a user configuration request to modify one or more user-configurable settings that affect behavior of the system. For example, the request may indicate a new password to be used to authenticate the user, a new authentication method to be used for authentication requests related to one or more online services, and so forth. The user may also configure a balance between level of security and acceptable authentication burden to the user. For example, some users may prefer strict security at the expense of ease of authentication, while other users may prefer the reverse. Continuing in block 450, the system configures an account associated with the user based on the received user configuration request. For example, the system may update in-memory and/or stored information about the user.

Continuing in block 460, the system updates stored account information associated with the user so that subsequent authentication requests will use the modified settings received from the user. For example, the system may update the user data store or other data store with the new settings. In addition to users, the system may also store information about online services that use the system for authentication and may provide a configuration interface through which online services can modify configurable settings. After block 460, these steps conclude.

Figure 5:
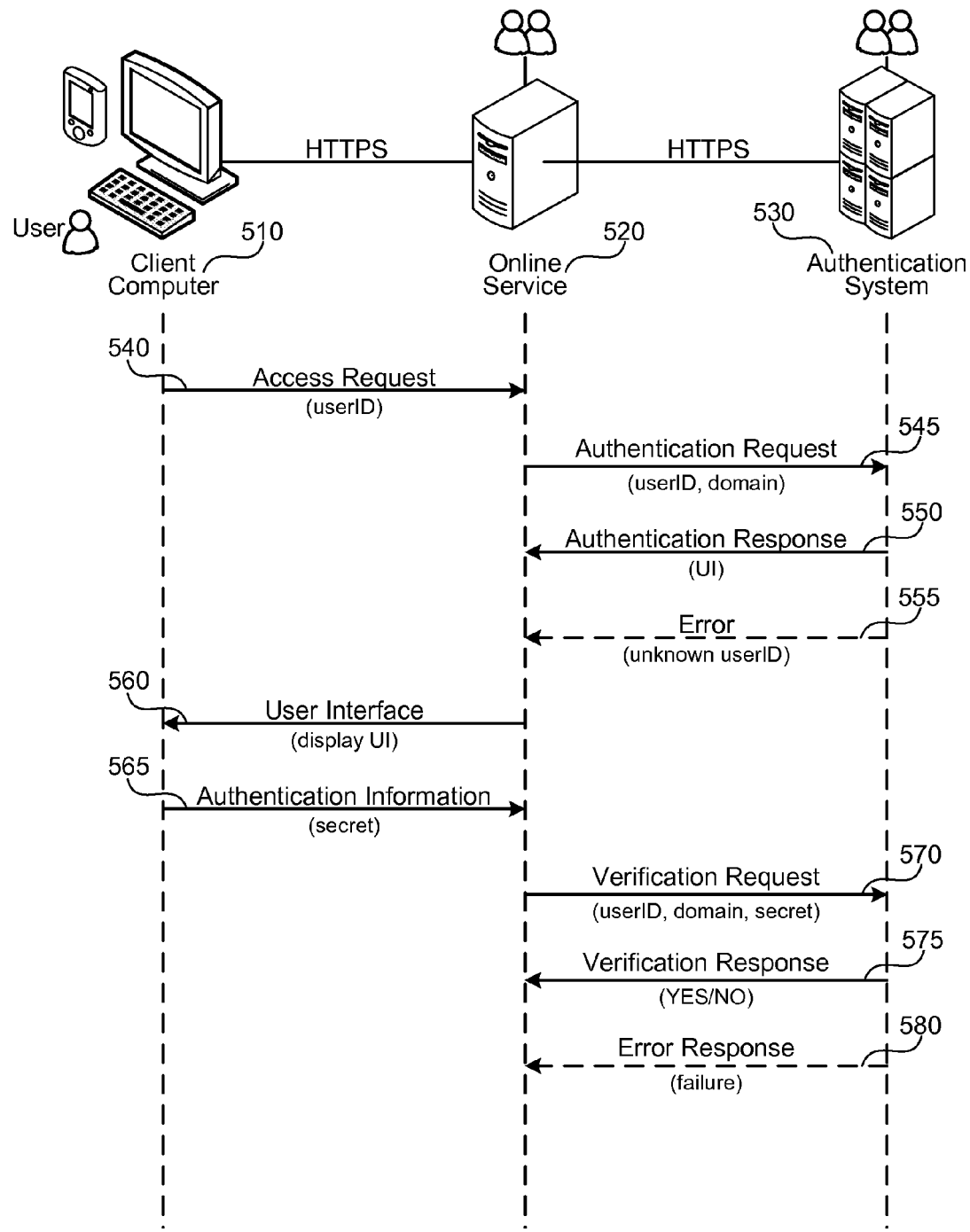
FIG. 5 is a network traffic diagram that illustrates the flow of information between the user, online service, and authentication system, in one embodiment.

FIG. 5 is a network traffic diagram that illustrates the flow of information between the user, online service, and authentication system, in one embodiment. A user at a client computer 510 sends an access request 540 to an online service 520. The access request 540 information identifying the user, such as a username or user ID. The online service 520 sends an authentication request 545 to the authentication system 530. The user wishes to authenticate to the online service 520 and may or may not be aware that the online service 520 delegates authentication to the authentication system 530. The authentication request 545 includes the user identifier and information identifying the online service. The authentication system 530 responds by sending an authentication response 550. The authentication response 550 includes user interface elements or other information describing information requested by the authentication system 530. In some cases, instead of the authentication response 550 the authentication system 530 may send an error 555, such as when the authentication system 530 does not recognize the user identifier.

Upon receiving the authentication request 545, the authentication system 530 looks up the user identifier along with the domain of the online service 520. If the system 530 finds the user identifier along with the domain of the online service 520, the system 530 determines an authentication mechanism for the user, and returns the user interface elements for the authentication mechanism to the online service 520 in the authentication response 550. The authentication system 530 may also perform any pre-authentication steps for the particular authentication mechanism. Finally, the authentication system 530 may also set up an authentication context that contains information to identify the authentication that will take place. For example, the context may include the user identifier, the domain of the online service 520, a timestamp, and other information about the authentication.

Upon receiving the authentication response 550, the online service 520 displays the user interface 560 to the user, such as by sending a web page or other user interface. The user provides authentication information 565, such as a secret known by the user that proves the user's identity. The authentication information 565 received by the online service 520 depends on the type of information requested by the authentication system 530. The authentication information may come from something the user knows, for example a password or PIN, or something the user has, for example a hardware authentication token or a plurality of other authentication solutions. The online service 520 provides the authentication information to the automation system 530 in a verification request 570. The verification request 570 may include information identifying the user, information identifying the online service, and any secret/response provided by the user. In response, the authentication system 530 sends a verification response 575 that indicates whether the user is authenticated and can access the requested resource. In some cases, the system may send an error response 580, indicating that some part of authentication failed. Those of ordinary skill in the art will recognize that communication between the client computer 510, online service 520, and authentication system 530 may occur using HTTPS or any other suitable protocol.

Upon receiving the verification request 570, the authentication system 530 looks for a previously set authentication context using the user identifier and online service 520 domain. If the system finds an authentication context, the system uses the received authentication information to complete the authentication. The system 530 returns the success or failure of the authentication to the online service 520. If the system cannot find an authentication context, the system returns an error response 580. Further note that some aspects of the system 530 are not represented in the diagrams. The plurality of authentication tokens is an aspect of the service. The online service 520 does not know what authentication tokens the user may have, or any details about how the authentication occurs. The decoupling of the user from the online service 520 is an aspect of the dynamic authentication system. A user or online service 520 may disable the user's account for one or more online services, but the authentication system 530 still recognizes the user for other online services. For example, if a user is no longer an employee of an online service 520 represented by a corporate entity, that user is still able to login to the user's other online services unrelated to the entity.

An online service 520 may specify a "quality" aspect of the authentication to indicate a desired level of "strength." Risk analysis of any particular authentication may be provided by the system. The system may perform data mining of authentications occurring for a single user across many online services, including but not limited to temporal aspects of authentications (when they occurred), geo-locations of authentications (where they occurred), and rate of authentications (how fast they occurred) to create risk analysis of further authentications. The system may use this analysis to enhance the system.

In some embodiments, the dynamic authentication system provides an online service provider with a different authentication by user type. For example, a bank may allow 90% of users to log in with passwords, but use a hardware token for 10% of users (e.g., high dollar clients). The dynamic authentication system allows both authentication methods to coexist on the same site. The online service provider can request the higher level of authentication as the provider receives access requests or during a pre-configuration session with the system.

In some embodiments, the dynamic authentication system allows users to lock out authentication completely, such as at particular times of day or while the user is traveling. A user can visit a website associated with the system, indicate times that the user is not accessing online services, and disable authentication during those times. Many security breaches result from the near unfettered ability to attempt fraudulent access that hackers have. By disallowing authentication when the user is not available, the system allows users to reduce the attack surface for possible fraudulent logins. This and many other types of customizations are possible with the dynamic authentication system.

In some embodiments, the dynamic authentication system uses aggregated data across user logins to provide services to users. For example, the system may suggest sites the user may like to try based on sites others have visited. The system uses care to ensure that no user data is exposed, and thus is careful not to provide any services through which information about a particular user can be discovered. To this end, the system may anonymize data and not report data for which a sufficient number of data points are not yet available. For example, reporting data aggregated from 100 users is less likely to expose personal information than data aggregated from 10 users.

In some embodiments, the dynamic authentication system supports a word of the day for a password. Because the system can work for all or many of the online services a user accesses, the system can easily change the authentication method or information frequently. Thus, for example, the system can assign a word of the day that the user can use as a password to access any online service. Because the word changes daily, the user's care with the password is less likely to lead to unauthorized access. The system may email or text the new password to the user at the beginning of each day.

In some embodiments, the dynamic authentication system provides a client side widget that runs in the user's browser and displays information about the sites the user visits. For example, the widget may display how many times the user has visited a particular site. If visiting a frequent site, like the user's web-based email provider, the user would expect to see a high number of visits. If, on the other hand, the user thought he was visiting a frequently visited site and noticed that the client widget displays zero visits and a red warning indicator, the user might suspect a phishing scheme had led the user to a phony, lookalike site. Thus, the information provided by the client widget provides one more layer of protection for the user.

In some embodiments, the dynamic authentication system softens or hardens the level of authentication for accessing various online services based on a level of confidence that observed activities are in character for the user. For example, if a user attempts to logon from a foreign country, then the system may initially suspect fraudulent activity and harden the requested level of authentication. For example, the system may ask for a current value from a hardware token in addition to a password. However, if the user's activities were in line with past data, such as accessing sites in a familiar order or in a familiar time range (perhaps when adjusted for the foreign country's time zone), then the system may soften the level of authentication to allow subsequent accesses to complete with less burdensome forms of authentication.

In some embodiments, the dynamic authentication system may automatically provide a response to a step of the two-pass authentication. For example, an online service provider may access the user's user identifier from a cookie stored on the user's client computer. Thus, the user may access a site and only see a request for authentication information after the online service has already provided the user identifier to the dynamic authentication system. As another example, the system may have such a high degree of confidence that an access comes from a particular user that the system may not request any secondary information in the authentication response. For example, the user may so frequently access sites in a particular order and from a particular computer system that additional forms of authentication are excessive. Thus, the system may infer satisfaction of the second pass from the circumstances surrounding the access request.

In some embodiments, the dynamic authentication system can be used for non-user authentication. In addition to users, authentication is used for servers communicating with other services, and other types of non-user communication. Principles similar to those described can be applied to non-user authentication. For example, a server can be asked for differing levels of authentication information based on whether another server believes a supposed identity to be correct. The decision may be based on time of access, location from which the request originates, and other factors that raise or lower a level of confidence in the source of the request.

In some embodiments, the dynamic authentication system is available as a Software-as-a-Service (SaaS) that delivers all of the benefits of hosted solutions: no additional headcount or hardware required, fixed monthly fees, and access to a greater breadth of technical resources than a company could justify internally. The system provides online service providers with an unprecedented level of security for all types of online transactions. Users can easily move to much higher levels of security without the online service provider incurring additional cost. The system also offloads risks of maintaining password security. The centralized, double-path authentication process of the system removes the responsibility of maintaining password security from businesses and merchants.

In some embodiments, the dynamic authentication system combats phishing. The system offers multiple lines of defense against phished passwords from being used for online services that leverage the system. First, the system uses IP checking and piggybacks stronger authentication on top of suspect or "unseen" IP addresses. Second, the system uses aggregate heuristics to look at how a given user typically logs in, such as day of week, time of day, and location. Last, the system offers a small widget that can indicate the state of where a user is logged in with a green (go) or red (caution) indicator. This approach is better than URL scanning, and does not suffer from typo-phishing (i.e., domains that look very similar to real domains, such as mvbank.com instead of the legitimate mybank.com). The system evaluates risk across domains. The system can not only analyze the risk of any individual authentication event, but also evaluate authentications occurring for a single user across many online accounts on different domains. By looking at time, place, frequency, and other statistical outliers, the system can identify possible malicious attempts prior to a real crisis, warn users early, and make recommendations for further authentication.

In some embodiments, the dynamic authentication system provides the ability to apply successful enrollment and successful authentication metrics across domains. If a user is enrolled with a particular level of assurance (LoA), the system can proxy that to another domain. If a user has successfully logged in and has been geo-located by IP address, or temporal heuristics have been gathered, the system can proxy that to other domains/authentications.

From the foregoing, it will be appreciated that specific embodiments of the dynamic authentication system have been described herein for purposes of illustration, but that various modifications may be made without deviating from the spirit and scope of the invention. Accordingly, the invention is not limited except as by the appended claims.

I claim:

1. A computer-implemented method for authenticating a user for access to an online service using a variable authentication type, the method comprising:
receiving from an online service an authentication request that includes user identity information and an indication of the online service that submitted the request;
dynamically determining one or more authentication criteria to use to authenticate the identified user, by dynamically selecting one or more modes of authentication based on a determined level of confidence that the user is who the user claims to be such that a user receives one authentication criterion during one authentication request and another authentication criterion during another authentication request;
sending to the online service an authentication response that requests satisfaction of the determined authentication criteria by the user, wherein the authentication response comprises a previously configured authentication method set by the user;
receiving from the online service a verification request that includes user identity information and a response to the authentication criteria;
validating the information received in the verification request to determine whether a user requesting access is the user identified by the user identity information; and
upon determining that the information received in the information request matches one or more expected answers, sending to the online service a verification response indicating that the access request is allowed,
wherein the preceding steps are performed by at least one processor.

2. The method of claim 1 wherein receiving the authentication request comprises receiving a user name associated with the user and a domain associated with the online service.

3. The method of claim 1 wherein determining one or more authentication criteria comprises determining a least burdensome set of authentication criteria that will provide a sufficient degree of confidence in the user's identity in accordance with the sensitivity of information to which the user is requesting access.

4. The method of claim 1 wherein determining one or more authentication criteria comprises determining the authentication method based on the user's identity.

5. The method of claim 1 wherein determining one or more authentication criteria comprises determining the authentication method based on the online service that submitted the request.

6. The method of claim 1 wherein determining one or more authentication criteria comprises determining the authentication method based on historical information stored about the user.

7. The method of claim 1 wherein determining one or more authentication criteria comprises adapting a rigor of authentication based on one or more circumstances of the request.

8. The method of claim 1 wherein sending the authentication response comprises sending one or more user interface elements for requesting the determined authentication criteria.

9. The method of claim 1 wherein receiving the verification request comprises receiving one or more answers to any previously presented authentication queries to the user.

10. The method of claim 1 wherein validating the information received comprises comparing a received secret to a secret stored in a user data store managed by an authentication system.

11. The method of claim 1 further comprising, after validating the information received, storing a verification result and information about the request for use during a subsequent authentication request.

12. A computer system for providing a hosted authentication service to multiple online resources, the system comprising:
a processor and memory configured to execute software instructions embodied in the following components;
an account creation component configured to receive user information and to create an account for the user;
a user data store configured to store user information about users of the system;
an authentication request component configured to receive first requests from online services from users attempting to access the online services, wherein the requests include user identity information;
an authentication criteria component configured to dynamically determine one or more authentication criteria for proving a user's identity in response to a received authentication request, by dynamically selecting one or more modes of authentication based on a determined level of confidence that the user is who the user claims to be such that a user receives one authentication criterion during one authentication request and another authentication criterion during another authentication request, and to provide a response to each received request based on the determined authentication criteria, wherein the authentication criteria component is further configured to access a previously configured authentication method set by the user and to provide the authentication method in the response to the received request; and
a verification request component configured to receive second requests from online services from users attempting to access the online services, wherein the requests include user responses to the determined authentication criteria.

13. The system of claim 12 wherein the account creation component is further configured to receive at least a user name, contact information for the user, and one or more methods of authentication that the user prefers.

14. The system of claim 12 wherein the user data store is further configured to store historical information about a user's authentication attempts and online sites the user has visited from which authentication requests were received.

15. The system of claim 12 wherein the authentication request component is further configured to invoke the authentication criteria component to determine one or more authentication methods to use for proving the user's identity.

16. The system of claim 12 wherein the authentication criteria component is further configured to determine criteria based on authentication requests received from multiple online services accessed by the user.

17. The system of claim 12 wherein the authentication criteria component is further configured to determine criteria based on at least one factor selected from the group consisting of a computer from which the user is requesting access, a time of day, a past historical pattern of the user, whether the online service is commonly accessed by the user, and how fast the user types compared to past observations.

18. The system of claim 12 further comprising a configuration component configured to receive configuration information from parties to the system, wherein a user can configure a single authentication method for logging into multiple online services that can be changed in one place.

19. A non-transitory computer-readable storage medium comprising instructions for controlling a computer system to access a hosted authentication provider for authenticating access to an online service, wherein the instructions, upon execution, cause a processor to perform actions comprising:
- receiving from an online service an authentication request that includes user identity information and an indication of the online service that submitted the request;
- dynamically determining one or more authentication criteria to use to authenticate the identified user, by dynamically selecting one or more modes of authentication based on a determined level of confidence that the user is who the user claims to be such that a user receives one authentication criterion during one authentication request and another authentication criterion during another authentication request;
- sending to the online service an authentication response that requests satisfaction of the determined authentication criteria by the user, wherein the authentication response comprises a previously configured authentication method set by the user;
- receiving from the online service a verification request that includes user identity information and a response to the authentication criteria;
- validating the information received in the verification request to determine whether a user requesting access is the user identified by the user identity information; and
- upon determining that the information received in the information request matches one or more expected answers, sending to the online service a verification response indicating that the access request is allowed,
- wherein the preceding steps are performed by at least one processor.

\* \* \* \* \*